(12) United States Patent
Gilstring

(10) Patent No.: US 10,561,058 B2
(45) Date of Patent: Feb. 18, 2020

(54) METER HOUSING FOR FEEDING GRANULAR OR POWDERED MATERIAL, METER SYSTEM, AGRICULTURAL IMPLEMENT COMPRISING SUCH METER SYSTEM AND METHOD FOR FEEDING GRANULAR OR POWDERED MATERIAL

(71) Applicant: Väderstad Holding AB, Väderstad (SE)

(72) Inventor: Gert Gilstring, Vadstena (SE)

(73) Assignee: Vaderstad Holding AB, Vaderstad (SE)

( * ) Notice: Subject to any disclaimer, the term of this patent is extended or adjusted under 35 U.S.C. 154(b) by 75 days.

(21) Appl. No.: 15/766,482

(22) PCT Filed: Oct. 6, 2016

(86) PCT No.: PCT/SE2016/050960
§ 371 (c)(1),
(2) Date: Apr. 6, 2018

(87) PCT Pub. No.: WO2017/061941
PCT Pub. Date: Apr. 13, 2017

(65) Prior Publication Data
US 2018/0310470 A1    Nov. 1, 2018

(30) Foreign Application Priority Data
Oct. 8, 2015    (SE) ...................... 1551290

(51) Int. Cl.
*A01C 15/00*    (2006.01)
*A01C 7/12*    (2006.01)
(Continued)

(52) U.S. Cl.
CPC .............. *A01C 15/005* (2013.01); *A01C 7/08* (2013.01); *A01C 7/124* (2013.01); *A01C 7/127* (2013.01); *A01C 15/04* (2013.01); *B65D 88/64* (2013.01)

(58) Field of Classification Search
CPC ......... B65D 88/64; G01F 11/10; G01F 11/12; G01F 11/20; G01F 11/22; G01F 11/24;
(Continued)

(56) References Cited

U.S. PATENT DOCUMENTS 46,821 A * 3/1865 Regan ...................... G01F 11/24
                                                      222/368
111,726 A * 2/1871 Carman .................. G01F 11/24
                                                      222/306
(Continued)

FOREIGN PATENT DOCUMENTS

DE        420826 C    10/1925
DE        74845 C     5/1984
(Continued)

*Primary Examiner* — Patrick M. Buechner
(74) *Attorney, Agent, or Firm* — Coats & Bennett PLLC

(57) ABSTRACT

A meter housing comprises a meter space with a material inlet and a material outlet, and a wall portion extending between the material inlet and the material outlet. The wall portion has substantially the form of a cylinder sector. The wall portion has a scraper part, which extends substantially parallel to a central axis of the cylinder sector.

17 Claims, 2 Drawing Sheets

(51) Int. Cl.
  *B65D 88/64* (2006.01)
  *A01C 7/08* (2006.01)
  *A01C 15/04* (2006.01)

(58) Field of Classification Search
  CPC ......... G01F 13/006; G01F 15/14; A01C 7/12;
         A01C 7/124; A01C 7/125; A01C 7/127;
         A01C 15/04; A01C 15/005; A01C 7/08
  USPC .......................................................... 222/342
  See application file for complete search history.

(56) References Cited

U.S. PATENT DOCUMENTS

| | | | | |
|---|---|---|---|---|
| 533,255 A * | 1/1895 | Warner | .................... | G01F 11/24 73/218 |
| 647,965 A * | 4/1900 | Herron et al. | .......... | G01F 11/24 222/293 |
| 2,022,631 A * | 11/1935 | Woodford | ............... | G01F 3/065 73/259 |
| 2,262,231 A * | 11/1941 | Guibert | ..................... | G01F 3/10 73/261 |
| 2,367,311 A * | 1/1945 | Reece | ................. | B65G 53/4633 222/338 |
| 2,408,285 A * | 9/1946 | Ashbaugh | ........... | B29C 45/1808 425/448 |
| 2,636,479 A * | 4/1953 | Smyser | ..................... | G01F 3/06 418/153 |
| 2,754,995 A * | 7/1956 | Switzer | .............. | B65G 65/4881 222/63 |
| 2,853,978 A * | 9/1958 | Smyser | ..................... | G01F 3/06 418/146 |
| 3,048,132 A * | 8/1962 | Morgan | ................... | A01C 7/04 111/153 |
| 3,072,301 A * | 1/1963 | Burke | .................... | B65G 65/00 222/342 |
| 3,225,661 A * | 12/1965 | Smyser | ..................... | G01F 1/06 418/112 |
| 3,245,386 A * | 4/1966 | Bentele | .................... | F01C 19/04 418/99 |
| 3,268,266 A * | 8/1966 | Brown | ............... | B65G 53/4633 406/30 |
| 3,568,893 A * | 3/1971 | Becker | ..................... | G01F 11/24 222/363 |
| 3,572,555 A * | 3/1971 | Knight | ................. | B01F 11/0258 222/342 |
| 3,895,745 A | 7/1975 | Hook | | |
| 3,922,755 A * | 12/1975 | Righele | .................. | A22C 11/08 452/41 |
| 3,982,672 A * | 9/1976 | Farmery | .................. | A01C 7/12 222/274 |
| 4,179,043 A * | 12/1979 | Fischer | .................... | G01F 11/24 222/368 |
| 4,180,188 A * | 12/1979 | Aonuma | ............ | B65G 53/4633 222/368 |
| 4,231,495 A | 11/1980 | Lund | | |
| 4,480,948 A * | 11/1984 | Dreyer | ................... | A01C 15/04 222/148 |
| 4,522,340 A * | 6/1985 | Gandrud | ................ | A01C 15/04 222/238 |
| 4,602,727 A * | 7/1986 | Jackson | .................. | G01F 11/24 222/368 |
| 4,811,864 A * | 3/1989 | Balmer | ................. | B65G 45/14 222/148 |
| 5,314,090 A * | 5/1994 | Alexander | ............. | B05B 7/144 222/1 |
| 5,324,143 A | 6/1994 | Sanders | | |
| 2008/0190964 A1 * | 8/2008 | Ben Shlomo | .......... | A47G 19/34 222/368 |
| 2010/0307395 A1 * | 12/2010 | Snipes | ................... | A01C 7/102 111/11 |
| 2011/0049198 A1 * | 3/2011 | Muth | ...................... | G01F 11/24 222/636 |
| 2015/0189827 A1 * | 7/2015 | Gilstring | ................ | A01C 7/081 222/1 |

FOREIGN PATENT DOCUMENTS

| | | |
|---|---|---|
| DE | 3432316 A1 | 3/1986 |
| DE | 3630425 C1 | 3/1988 |
| DE | 102011010619 A1 | 8/2012 |
| FR | 2294622 A2 | 7/1976 |
| GB | 860235 | 2/1961 |
| WO | 9812512 | 3/1998 |
| WO | 2004015378 A1 | 2/2004 |
| WO | 2008150241 A1 | 12/2008 |
| WO | 2013180619 A1 | 12/2013 |
| WO | 2015069179 A1 | 5/2015 |
| WO | 2015112086 A1 | 7/2015 |

* cited by examiner

METER HOUSING FOR FEEDING GRANULAR OR POWDERED MATERIAL, METER SYSTEM, AGRICULTURAL IMPLEMENT COMPRISING SUCH METER SYSTEM AND METHOD FOR FEEDING GRANULAR OR POWDERED MATERIAL

TECHNICAL FIELD

This document relates to a meter housing for feeding granular or powdered material, which has a use in agricultural implements in particular.

The document also relates to a system for feeding granular or powdered material comprising such a meter housing and an agricultural implement comprising such a system.

Furthermore, the document relates to a method for feeding granular or powdered material in an agricultural implement.

BACKGROUND

It is known, for example from WO2013180619A1, in an agricultural implement, to feed granular or powdered material from a material container via a meter to a channel that takes up the material in an air stream and that feeds the material onward to, for example, a plurality of furrow openers.

The meter comprises a meter housing, in which a metering rotor is rotatably disposed.

The air stream is typically achieved by a fan or a pump, which produces an overpressure in the channel that leads the air stream.

It is desirable to ensure that the overpressure is maintained in the entire channel in order to reduce energy consumption, and it is a challenge to introduce the material in the channel without losing the overpressure.

One way of achieving this is to provide the material container with a seal-tight lid, so that the overpressure is maintained all the way up in the material container.

Another way of achieving this is to utilize an injector, in which a vacuum suction to the channel is achieved according to the Venturi principle.

Another method is to provide a meter that acts as an air lock and thus prevents the overpressure in the channel from leaking up into the material container, allowing normal pressure in the material container.

Normal pressure in the material container is advantageous, since it is difficult to provide a large material container with a similarly large lid which is sufficiently seal-tight.

One problem is that the environment in which the agricultural implement is used and the material being fed often give rise to large amounts of dust and dirt, which makes it difficult to achieve good seal-tightness.

An additional problem is that the material to be fed can disturb the function of the metering rotor, so that the rotor blades are prevented from being sealed against the inside of the meter housing.

Based on the fact that it is desirable to provide a meter that acts as an air lock, there is a need for an improved meter, in particular a meter which reduces air leakage in a reverse direction from the meter outlet to the meter inlet.

SUMMARY

One object is thus to provide an improved meter. A particular object is to provide a meter which causes less loss of pressure than known meters.

The invention is defined in the independent claims. Embodiments are set forth in the dependent claims, in the description that follows and in the drawings.

According to a first aspect, a meter housing for feeding granular or powdered material is provided. The meter housing comprises a meter space with a material inlet and a material outlet, and a wall portion extending between the material inlet and the material outlet. The wall portion has substantially the form of a cylinder sector. The wall portion has a scraper part, which extends substantially parallel to a central axis of the cylinder sector.

Here, "substantially parallel" means +/−10°, preferably +/−5°, +/−1° or fully parallel.

By providing a scraper part, the material that is stuck between the rotor blades and wall can be loosened, wherein the sealing bearing between the distal part of the rotor blade and the wall can be restored.

Trials have shown that leakage flow from the material outlet to the material inlet can be reduced by around 30-50%.

The scraper part can comprise at least one groove recessed in the wall portion, which groove extends along substantially the full axial length of the cylinder sector.

A groove has the advantage that material can be removed in a way that does not damage the rotor blade.

The scraper part can comprise at least one ridge, which extends along substantially the full axial length of the cylinder sector.

A ridge has the advantage of maintaining a sealing bearing in the event that no material is stuck between the wall and the rotor blade that passes the ridge.

The scraper part can extend across a central angle for the cylinder sector which is less than 10°, preferably less than 5 degrees, less than 1° or less than 0.5°.

"Central angle" means an angle around the central axis of the cylinder sector.

The scraper part can be located at an upper part of the wall portion in a vertical direction, preferably within a central angle for the cylinder sector corresponding to the most highly situated 45°, the most highly situated 30° or the most highly situated 15°.

With the scraper part being near the inlet opening, and preferably in a position such that the space between the rotor blades is still being filled, it is possible for the material that is scraped off to be taken up by the space between the rotor blades.

The scraper part can be located at a distance from the upper edge of the wall portion, which distance preferably can correspond to at least 20%, at least 40% or at least 60% of the extension of the scraper part along a central angle for the cylinder sector.

The wall portion thus has a part which is located between the scraper part and the inlet opening of the meter housing. As a result, the risk of any additional granules entering and getting stuck between the rotor blade and the wall portion is reduced.

The part of the wall portion located on a vertical level below the central axis can be continuous, without any additional scraper parts.

According to a second aspect, a metering system for feeding granular or powdered material in an agricultural implement is provided. The metering system comprises a meter housing as described above, and a metering rotor, which is rotatably driven in the meter space while outer portions of rotor blades of the metering rotor are in contact with the wall portion.

The contact between the rotor blades and the meter housing is preferably airtight, which can be achieved by the rotor blades being pre-tensioned against the meter housing.

The rotor blades can be formed in an elastic material, preferably a rubber elastic material, such as rubber, TPE or polyurethane.

The rotor blades can be pre-tensioned against the wall portion, so that air leakage between the material inlet and the material outlet is prevented.

In the metering system, the scraper part can be arranged so that the scraper part is located downstream, viewed in a direction of material flow, from a vertical highest point at which said rotor blades are in contact with the wall portion, and within a central angle for the cylinder sector from the highest point corresponding to less than 30°, preferably less than 20° or less than 10°.

According to a third aspect, an agricultural implement for feeding granular or powdered material is provided. The agricultural implement comprises a container for the material, an air flow generating device, and a channel connected to the air flow generating device. The agricultural implement further comprises a metering system as described above, arranged for feeding the material from the container to the air channel.

According to a fourth aspect, a method for feeding granular material or powdered material in an agricultural implement is provided. The method comprises receiving the material in a material inlet located at an upper portion of a meter housing, using a metering rotor having rotor blades which bear on a cylinder sector shaped wall portion extending between the material inlet and the material outlet, to feed a predetermined amount of material per time unit, and feeding out the material in a material outlet located at a lower portion of the meter housing. The method further comprises using a radial level variation in the wall portion to loosen material that is stuck between the rotor blade and the wall portion.

The loosening can be achieved downstream of the material inlet and upstream of a vertical level corresponding to the central axis of the metering rotor.

Preferably, the rotor blades, from a vertical level corresponding to the central axis and onward to the material outlet, can have a substantially constant bearing force against the wall portion.

DETAILED DESCRIPTION

Figure 1:
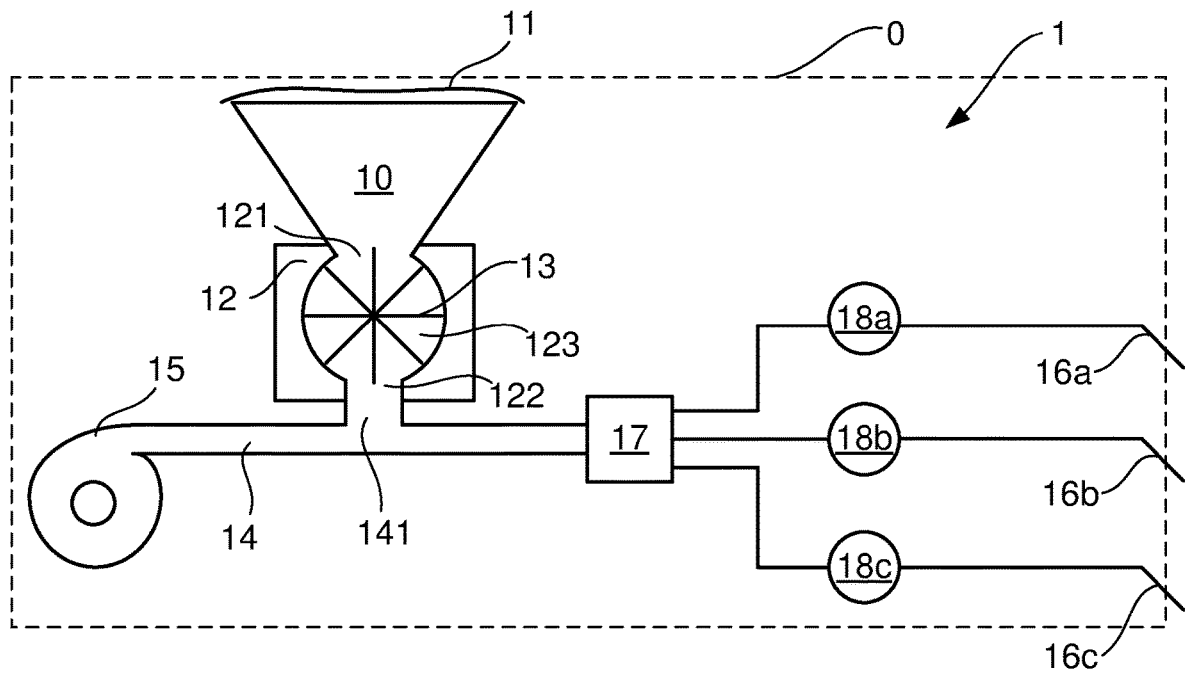
FIG. 1 is a schematic view of a metering system 1 for feeding granular or powdered material.

In FIG. 1, a metering system 1 is shown, which can be supported by an agricultural implement 0 and thus be used for distribution of granular or powdered material on the ground on which the agricultural implement is traveling.

A non-limiting example of a material of this kind can be seed, fertilizer and/or pesticides. It will be appreciated that different types of material can be fed in the same system, and that an agricultural implement can be equipped with parallel systems where, for example, one feeds seeds and another feeds fertilizer or pesticides.

The system 1 comprises a material container 10, which can have a cover 11 in the form of a lid or a tarpaulin. The system further comprises a meter housing 12, which includes a metering rotor 13 which is rotatable in the meter housing 12.

The metering rotor 13 can be driven by a drive unit, such as an electric or hydraulic motor (not shown). The metering rotor 13 can be driven directly by the motor or indirectly, for example via a transmission which can comprise gears, belts or friction wheels.

The meter housing 12 has an inlet 121 at its upper portion and an outlet 122 at its lower portion. The inlet 121 connects to a lower portion of the material container 10, so that material contained in this can be fed to the meter housing 12, at least partly using gravitation. Additional feeding can possibly be provided using an agitator, a feed screw or a fluidized bed.

The meter housing 12 includes a meter space 123, which can have a generally cylindrical form.

The meter space 123 has a cylindrical limit surface 124, whose radius is approximately equal in size to, or somewhat smaller than, a radius of the metering rotor 13.

The radial outer portion of the wing blades 131 of the metering rotor can thus bear upon the cylindrical limit surface 124. The bearing can be such that the wing blades 131 are pre-tensioned against the cylindrical limit surface 124. Therefore, the wing blades, as a result of the friction between the wing blades and the cylindrical limit surface 124, can bend out a little while the metering rotor 13 rotates in the meter space 123.

The meter space 123 can also have axial limit surfaces, of which at least one can have a bushing for an axle around which the metering rotor 13 is rotatable. This axle can be a drive axle which, as described above, can be connected to the drive unit.

In the event of an axially opposite portion of the metering rotor 13, an axial limit surface can comprise a bushing and/or bearing for the axle.

According to a first alternative embodiment, the metering rotor 13 can have a free end in the meter housing, i.e. no support in the radial direction in the event of an axially opposite portion relative to the drive axle.

According to a second alternative embodiment, an axle bushing for a drive axle can be provided at one of the axial ends of the metering rotor 13, while at its other axial end a support in the form of an integrated part of an axial limit surface is provided.

The meter space 123 can have an axial length which is equal in size to, or somewhat smaller than, an axial length of the metering rotor 13.

The axial outer portions of the wing blades 131 of the metering rotor can thus bear against at least the one axial limit surface.

The bearing can be such that the wing blades 131 are pre-tensioned against the axial limit surface 124. Therefore, the wing blades, as a result of the friction between the wing blades and the axial limit surface, can bend out a little while the metering rotor 13 rotates in the meter space 123.

The metering housing 12 has an outlet 122, which connects to a channel, so that material fed by the metering rotor 13 is introduced into the channel 14 via a channel inlet 141.

A pump or a fan 15 can be connected to the channel to provide an air stream in the channel 14. At the channel inlet 141, the material can be introduced into the channel, so that an air stream mixed with material is achieved.

The channel 14 can lead the material directly to one or several feed-out parts, for example furrow openers 16a, 16b, 16c or fertilizer openers.

According to one alternative, a distributor 17 can be arranged for distributing the air stream mixed with material to the furrow openers 16a, 16b, 16c. Such distributors are known from, for example, WO2015112086A1.

As an additional alternative, or complement, one or more singulating devices 18a, 18b, 18c can be arranged to ensure a more even flow of material to the furrow openers 16a, 16b, 16c. Such singulating devices are known from, for example, WO2015069179A1.

The metering rotor 13 can comprise a rotor core 132 and a plurality of rotor blades 131. The rotor core 132 can be made of a relatively stiff material, such as metal or polymer. In the latter case, the rotor core can be made of a construction plastic with a relatively high stiffness.

The rotor core 132 can be integrated with a motor shaft, i.e. permanently connected to the motor shaft or made in one piece with the motor shaft. Alternatively, the rotor core 132 can be a separate part, which is connected to a motor shaft in such a manner that torque from the motor is transferable to the metering rotor 13.

The rotor blades 131 can be made of polymer material with a lower stiffness than the material that the rotor core is made of.

For example, the rotor blades can be made of an elastic material, such as a rubber elastic material, for example polyurethane, rubber, thermoplastic elastomer or similar. Elastic materials with hardness Shore A in ranges of 30-90, preferably 50-70, have proven to be suitable.

Preferably, the rotor blades 131 can also be made of a material which is softer than the material that the limitation walls 124 of the meter space are made of.

The rotor blades 131 can be made in one piece of material, which can surround and enclose the core 132.

Figure 2:
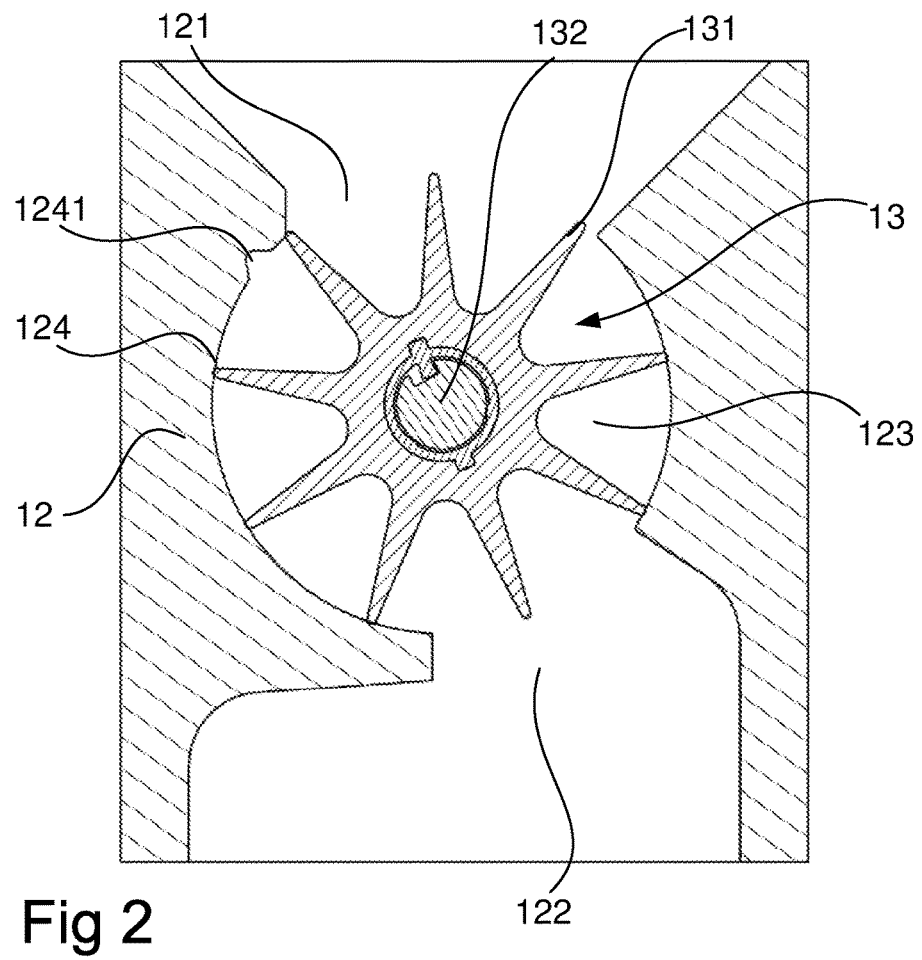
FIG. 2 shows a meter housing according to a first embodiment, viewed in section.

FIG. 2 shows a first embodiment of a meter housing, where one of the walls that define the meter space 123, specifically a cylinder sector shaped wall 124, has been provided with a recessed groove 1241 in the wall. The groove 1241 can extend across substantially the full axial length of the meter space 123.

The groove can have a depth corresponding to 0.1-20% of the radius of curvature of the wall 124, preferably 0.5-15%, 1-15%, 5-15%, 7-13% or around 10%.

The groove can have a width, along the tangential direction of the wall 124, which can be about 1°-30°, 5°-25°, 10°-20° or about 15°. The groove can have straight or curved walls.

For example, the groove can have a couple of straight walls, which at the bottom of the groove form an angle with each other.

Alternatively, the groove can have a substantially cylinder sector shaped cross-section.

Figure 3:
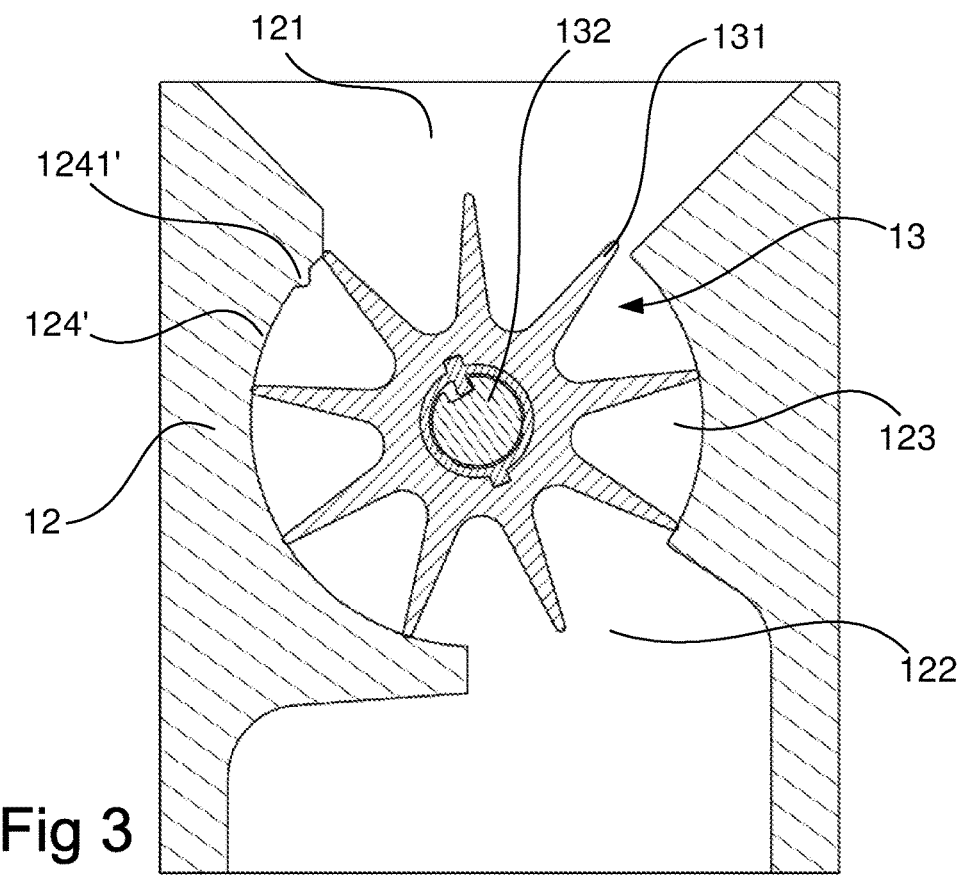
FIG. 3 shows a meter housing according to a second embodiment, viewed in section.

FIG. 3 shows a second embodiment of a meter housing, where one of the walls that define the meter space 123, specifically a cylinder sector shaped wall 124', has been provided with a ridge 1241' projecting from the wall. The ridge 1241 can extend across substantially the full axial length of the meter space 123.

The ridge can have a height corresponding to 0.1-20% of the radius of curvature of the wall 124', preferably 0.5-15%, 1-15%, 5-15%, 7-13% or around 10%.

The ridge can have a width, along the tangential direction of the wall 124, which can be about 1°-30°, 5°-25°, 10°-20° or about 15°. The ridge can have straight or curved walls.

For example, the ridge can have a couple of straight walls, which at the top of the ridge form an angle with each other.

Alternatively, the ridge can have a substantially cylinder sector shaped cross-section.

In an alternative embodiment, two, three or more ridges can be provided. Preferably, such ridges are substantially parallel to each other.

As an additional alternative, one or more grooves 1241 can be combined with one or more ridges 1241'.

Figure 4:
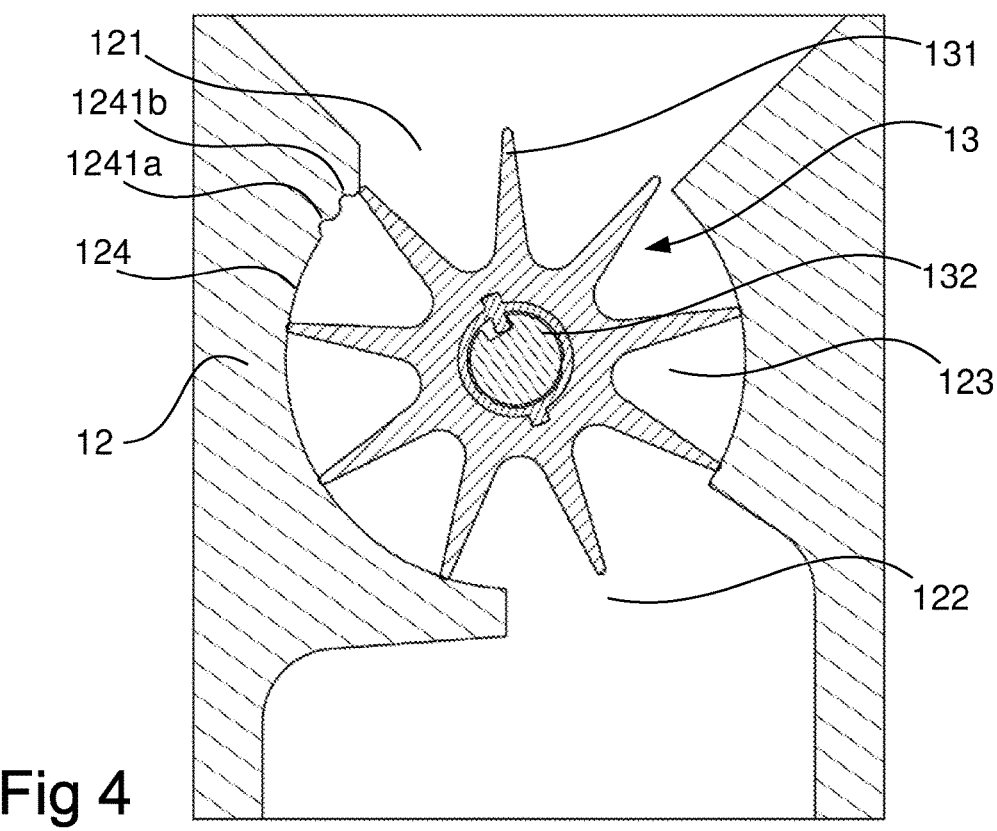
FIG. 4 shows a meter housing according to a third embodiment, viewed in section.

FIG. 4 shows an embodiment according to the illustration in FIG. 2, with the exception that here there are two grooves 1241a, 1241b instead, which are located adjacent each other and run in parallel to each other, within an angle amounting to less than 10°, preferably less than 5° or less than 3° around the center of the wall 124.

The invention claimed is:

1. A meter housing for an air lock feeder, for feeding granular or powdered material, comprising:
   a meter space with a material inlet and a material outlet, and
   a wall portion extending between the material inlet and the material outlet,
   the wall portion having substantially the form of a cylinder sector,
   wherein the wall portion has a scraper part, which extends substantially parallel to a central axis of the cylinder sector.

2. The meter housing according to claim 1, wherein the scraper part comprises at least one groove recessed in the wall portion, which groove extends along substantially a full axial length of the cylinder sector.

3. The meter housing according to claim 1, wherein the scraper part comprises at least one ridge, which extends along substantially a full axial length of the cylinder sector.

4. The meter housing according to claim 1, wherein the scraper part extends across a central angle for the cylinder sector which is less than 10°.

5. The meter housing according to claim 1, wherein the scraper part is located at an upper part of the wall portion.

6. The meter housing according to claim 1, wherein the scraper part is located at a distance from an upper edge of the wall portion, which distance corresponds to at least 20%, at least 40% or at least 60% of an extension of the scraper part along a central angle for the cylinder sector.

7. The meter housing according to claim 1, wherein a part of the wall portion, located on a vertical level below the central axis is continuous without any additional scraper parts.

8. The meter housing according to claim 1, wherein the scraper part is a radial level variation in the wall portion.

9. A metering system for feeding granular or powdered material in an agricultural implement, comprising:
   a meter housing according to claim 1, and
   a metering rotor, which is rotatably driven in the meter space while outer portions of rotor blades of the metering rotor are in contact with the wall portion.

10. The metering system according to claim 9, wherein the rotor blades are pre-tensioned against the wall portion, and configured so that air leakage between the material inlet and the material outlet is prevented.

11. The metering system according to claim 9, wherein scraper part is located downstream, viewed in a direction of material flow, from a vertical highest point at which said rotor blades are in contact with the wall portion, and within a central angle for the cylinder sector from the highest point corresponding to less than 30°.

12. An agricultural implement for feeding granular or powdered material, comprising:
   a container for the material,
   an air flow generating device,
   a channel connected to the air flow generating device, and
   a metering system according to claim 9, arranged for feeding the material from the container to the air channel.

13. The metering system according to claim 9, wherein the rotor blades are formed of an elastic material.

14. The metering system according to claim 13 wherein the elastic material comprises a rubber elastic material, TPE or polyurethane.

15. A method in an air lock feeder, for feeding granular material or powdered material in an agricultural implement, comprising:
   receiving the material in a material inlet located at an upper portion of a meter housing,
   using a metering rotor, having rotor blades which bear on a cylinder sector shaped wall portion extending between the material inlet and a material outlet, to feed a predetermined amount of material per time unit,
   feeding out the material in the material outlet located at a lower portion of the meter housing, and
   using a radial level variation in the wall portion to loosen material that is stuck between the rotor blade and the wall portion.

16. The method according to claim 15, wherein said loosening is achieved downstream of the material inlet and upstream of a vertical level corresponding to the central axis of the metering rotor.

17. The method according to claim 16, wherein the rotor blades, from a vertical level corresponding to the central axis and onward to the material outlet, have a substantially constant bearing force against the wall portion.

* * * * *